United States Patent
Cherian et al.

(10) Patent No.: US 9,451,628 B2
(45) Date of Patent: Sep. 20, 2016

(54) APPARATUS AND METHOD FOR FACILITATING PRIORITY INDICATION AND QUEUING FOR AN ACCESS TERMINAL

(75) Inventors: George Cherian, San Diego, CA (US); Jun Wang, La Jolla, CA (US); John W. Nasielski, San Diego, CA (US); Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 12/793,198

(22) Filed: Jun. 3, 2010

(65) Prior Publication Data

US 2010/0332610 A1 Dec. 30, 2010

Related U.S. Application Data

(60) Provisional application No. 61/221,495, filed on Jun. 29, 2009.

(51) Int. Cl.
*G06F 15/16* (2006.01)
*H04W 72/10* (2009.01)

(52) U.S. Cl.
CPC .................... *H04W 72/10* (2013.01)

(58) Field of Classification Search
CPC .................................................. H04W 72/10
USPC ......................................................... 709/207
See application file for complete search history.

(56) References Cited

U.S. PATENT DOCUMENTS

| | | | |
|---|---|---|---|
| 7,065,203 B1 * | 6/2006 | Huart et al. | 379/266.06 |
| 7,239,609 B2 * | 7/2007 | Yokota et al. | 370/230 |
| 7,330,453 B1 * | 2/2008 | Borella et al. | 370/338 |
| 7,761,323 B2 * | 7/2010 | Rafter et al. | 705/7.16 |
| 2003/0099197 A1 | 5/2003 | Yokota et al. | |
| 2005/0009565 A1 * | 1/2005 | Kwak | 455/561 |
| 2005/0101324 A1 | 5/2005 | Chambers et al. | |
| 2006/0154664 A1 | 7/2006 | Hidaka | |
| 2006/0258363 A1 | 11/2006 | Masuda | |
| 2007/0004421 A1 | 1/2007 | Chambers et al. | |
| 2007/0184863 A1 | 8/2007 | Takagi et al. | |

(Continued)

FOREIGN PATENT DOCUMENTS

| | | |
|---|---|---|
| CN | 101124833 A | 2/2008 |
| JP | H01189240 A | 7/1989 |

(Continued)

OTHER PUBLICATIONS

"Interoperability Specification for cdma2000 Air Interface," Jul. 27, 2007.*

(Continued)

*Primary Examiner* — Andrew Georgandellis
(74) *Attorney, Agent, or Firm* — François A. Pelaez

(57) ABSTRACT

A method and apparatus facilitating priority indication and queuing for an access terminal is provided. The method may comprise receiving an access request from an access terminal (AT), determining that the AT is a priority AT and that no resources are available in response to the access request, transmitting an access deny message to the priority AT, queuing the access request until a resource becomes available, and transmitting a resource available message to the priority AT upon a determination that a resource has become available.

26 Claims, 9 Drawing Sheets

(56) References Cited

U.S. PATENT DOCUMENTS

| | | |
|---|---|---|
| 2008/0310303 A1 | 12/2008 | Wang et al. |
| 2013/0107837 A1 | 5/2013 | Terry et al. |

FOREIGN PATENT DOCUMENTS

| | | |
|---|---|---|
| JP | H09215050 A | 8/1997 |
| JP | H1189240 A | 3/1999 |
| JP | H11146462 A | 5/1999 |
| JP | 2004193853 A | 7/2004 |
| JP | 2006310919 A | 11/2006 |
| JP | 2007535868 A | 12/2007 |
| WO | 2005083909 A1 | 9/2005 |
| WO | 2005112295 A2 | 11/2005 |
| WO | WO 2005112295 A2 * | 11/2005 |

OTHER PUBLICATIONS

International Search Report and Written Opinion—PCT/US2010/040497, International Search Authority—European Patent Office—Oct. 5, 2010.

TIA/EIA-95-B: "Mobile Station-Base Station Compatibility Standard for Wideband Spread Spectrum Cellular Systems (Upgrade and Revision of TIA/EIA-95-A," pp. 1-1206 (Mar. 1999).

* cited by examiner

APPARATUS AND METHOD FOR FACILITATING PRIORITY INDICATION AND QUEUING FOR AN ACCESS TERMINAL

CLAIM OF PRIORITY UNDER 35 U.S.C. §119

The present Application for patent claims priority to Provisional Application No. 61/221,495 entitled "Priority Indication and Queuing" filed Jun. 29, 2009, and assigned to the assignee hereof and hereby expressly incorporated by reference herein.

BACKGROUND

1. Field

The present application relates generally to wireless communications, and more specifically to methods and systems for facilitating priority indication and queuing for access terminals (ATs).

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple ATs. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

As a number of ATs accessing a communication system increases, network resources may not be readily available for requesting ATs. Currently in high rate packet data (HRPD) systems, an AT may back-off and may retry to access the network at a later point in time. While using such a back-off process, it is possible that some of the network resources may be freed up immediately after the request for a radio resource was denied by the network. However, the AT has backed-off this event is not recognized by the network, and as such resources are not granted until the AT retries a request. Further, during the time between attempts (e.g., after the resources are freed on the network and before a certain AT retries to obtain the resource) other ATs may request the radio resource, and the network may grant the radio resource to the other requesting ATs. As such, when the AT that was initially denied the resource retries, the resource may still not be available. Availability of resources for an AT may be more predominant when there is an emergency and/or a large number of users try to make calls at approximately the same time. This may lead to a situation where an emergency worker (e.g., fire department, police department, etc.) may have network resources requests rejected. Thus, improved apparatus and methods for facilitating priority indication and queuing for ATs are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with priority indication in wireless communications. According to one aspect, a method for priority indication in wireless communications is provided. The method can comprise receiving an access request from an access terminal (AT). Further, the method can comprise determining that the AT is a priority AT and that no resources are available in response to the access request. Additionally, the method can comprise transmitting an access deny message to the priority AT. Still further, the method can comprise queuing the access request until a resource becomes available. Moreover, the method can comprise transmitting a resource available message to the priority AT upon a determination that a resource has become available.

Still another aspect relates to a computer program product comprising a computer-readable medium. The computer-readable medium can include code for causing a computer to receive an access request from an access terminal (AT). Further, the computer-readable medium can include code for causing the computer to determine that the AT is a priority AT and that no resources are available in response to the access request. Still further, the computer-readable medium can include code for causing the computer to transmit an access deny message to the priority AT. Still further, the computer-readable medium can include code for causing the computer to queue the access request until a resource becomes available. Moreover, the computer-readable medium can include code for causing the computer to transmit a resource available message to the priority AT upon a determination that a resource has become available.

Yet another aspect relates to an apparatus. The apparatus can include means for receiving an access request from an access terminal (AT). Further, the apparatus can comprise means for determining that the AT is a priority AT and that no resources are available in response to the access request. Still further, the apparatus can comprise means for transmitting an access deny message to the priority AT. Additionally, the apparatus can comprise means for queuing the access request until a resource becomes available. Moreover, the apparatus can comprise means for transmitting a resource available message to the priority AT upon a determination that a resource has become available.

Another aspect relates to an apparatus. The apparatus can include a transceiver operable to receive an access request from an access terminal (AT). Further, the apparatus can include a resource allocation module operable to: determine that the AT is a priority AT and that no resources are available in response to the access request, and queue the access request until a resource becomes available. The apparatus transceiver can additionally be operable to: transmit an access deny message to the priority AT, and transmit a resource available message to the priority AT upon a determination that a resource has become available.

Furthermore, in accordance with one or more aspects and corresponding disclosure thereof, various aspects are described in connection with priority indication by an access terminal (AT). According to one aspect, a method for priority indication by an access terminal (AT). The method can comprise transmitting a first instance of an access request to an access network (AN). Further, the method can comprise receiving an access deny message in response to the transmitted access request. Moreover, the method can comprise activating a monitor-state mode, wherein the monitor-state mode monitors for one or more messages from the AN.

Still another aspect relates to a computer program product comprising a computer-readable medium. The computer-readable medium can include code for causing a computer to transmit an access request to an access network (AN). Further, the computer-readable medium can include code for causing the computer to receive an access deny message in response to the transmitted access request. Moreover, the computer-readable medium can include code for causing the computer to activate a monitor-state mode, wherein the monitor-state mode monitors for one or more messages from the AN.

Yet another aspect relates to an apparatus. The apparatus can include means for transmitting an access request to an access network (AN). Further, the apparatus can comprise means for receiving an access deny message in response to the transmitted access request. Moreover, the apparatus can comprise means for activating a monitor-state mode, wherein the monitor-state mode monitors for one or more messages from the AN.

Another aspect relates to an apparatus. The apparatus can include a transceiver operable to transmit an access request to an access network (AN), and receive an access deny message in response to the transmitted access request. Further, the apparatus can include an access module operable to activate a monitor-state mode, wherein the monitor-state mode monitors for one or more messages from the AN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, during communications within a wireless communications system, an access terminal (AT) may request a resource allocation from an access network (AN). Additionally, as used herein, the AT may include a mobile station (MS), wireless communications device (WCD), a user equipment (UE) or any device capable of communicating in a wireless network. In one aspect, the wireless communications system may include a high rate packet data (HRPD) system. In another such aspect, the HRPD system may include HRPD-Rev-C. In another aspect, priority indications and/or service may be provided between certain ATs and an AN to facilitate effective allocation of resources. Further, priority indications and/or service may be provided between an AN and a network gateway. As used herein, a network gateway may include a packet data serving node (PDSN), or any other network entity capable of facilitating communications in a wireless network. Moreover, to further effectively allocate resources in a network, queuing of connection requests may be performed. In one such aspect, queuing may be performed per-flow resource and allocation of resources may be biased toward priority flows.

As such, a system 100 may be implemented to support priority service indications and priority queuing. In one aspect, a priority indication may be based on an AT subscription, on a per call basis, etc. In an aspect in which a system denote priority through a subscription process, an AN (e.g., a radio access network (RAN)) may treat all calls from the subscriber to be priority call. Generally, inter-user priority and maximum per flow priority (e.g., as specified in 3GPP2 X.S0011) may be used, where maximum per flow priority for a user may be denoted through reserved priority classes 8 to 15, and where inter-user priority may be denoted through reserved priority classes 4 to 7. In an aspect in which a priority indication may be determined on a per-call basis, an AN and a first and/or last IP router may be made aware that a call is a priority call and authorize the priority call.

Further, RAN resources and IP resources may be allocated on a priority basis on a per call basis. In an aspect in which a priority indication may be determined on a per-call basis, for an AT originated priority call, the AT may indicate the priority to the originating AN and the first IP hop. Further, if the originating AT initiated a "priority call," then the receiving AT may be given "priority treatment" for the call. In such an aspect, a last IP hop and a terminating AN may be notified of priority status through inter-network signaling.

Figure 1:
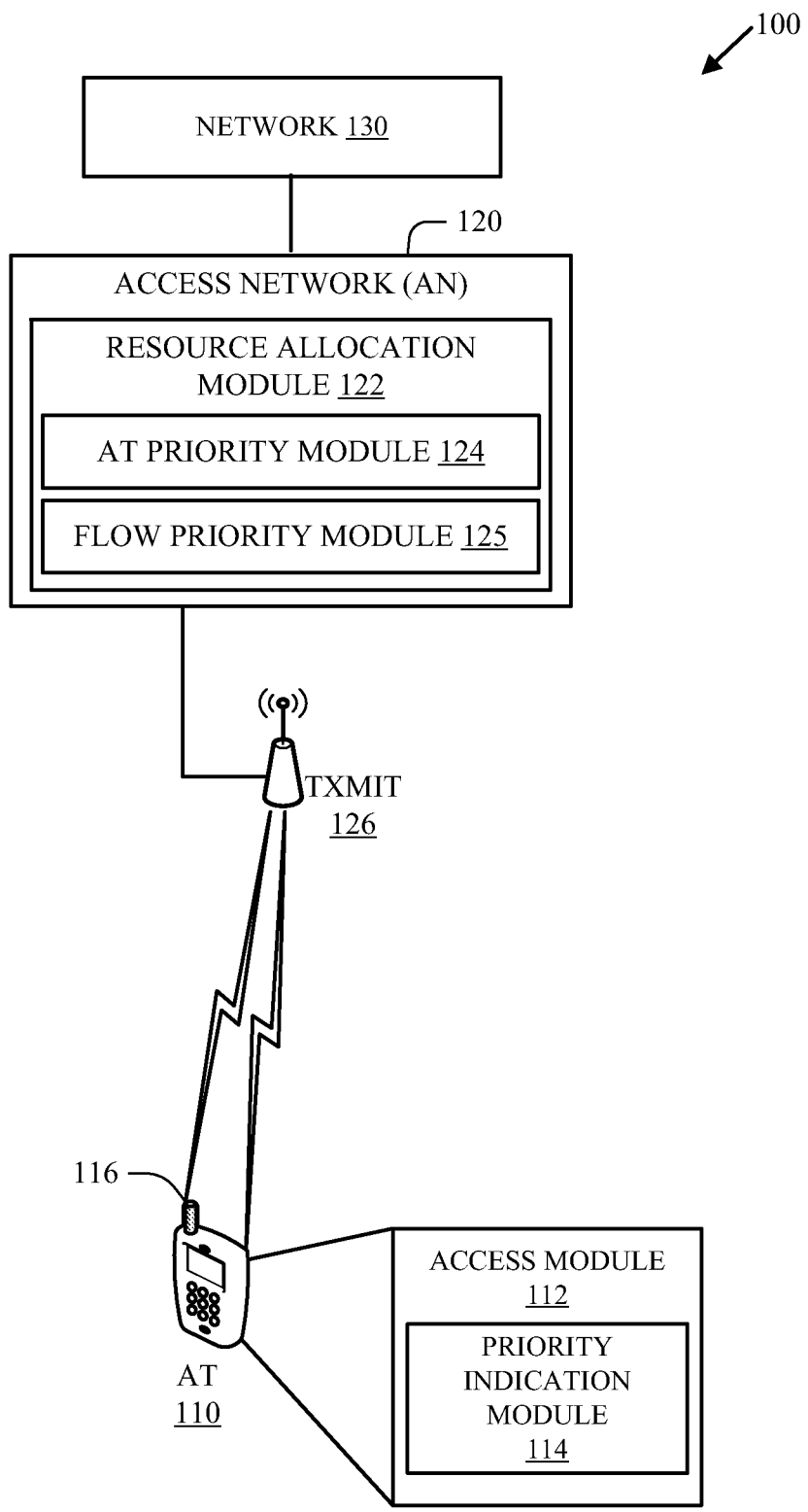
FIG. 1 illustrates a block diagram of a system for facilitating priority indication and queuing for an AT in a wireless communication system according to an aspect.

With reference now to FIG. 1, a block diagram of a system 100 for facilitating transmit diversity for communications in a wireless communication system is illustrated. System 100 may include one or more ANs 120 and one or more ATs 110 (e.g., wireless communications devices (WCD)), which can communicate via respective antennas 126 and 116. In one aspect, AN 120 may function as an E-NodeB. In one aspect, AN 120 may conduct a downlink (DL) communication to AT 110 via antennas 126. At the AT 110, the DL communication may be received via antennas 116. DL communications may provide content to the AT 110. Received content communicated from AN 120 to AT 110 may then be analyzed to determine whether such content has successfully been received. In another aspect, AT 110 may conduct an uplink (UL) communication to AN 120 via antennas 116. At the AN 120, the UL communication may be received via antennas 126. Further, control information may be communicated between the AN 120 and the AT 110, such as, CQI, SR and/or ACK/NACKs wherein an acknowledgement (ACK) may be transmitted for successfully received content and/or a negative acknowledgement (NACK) may be transmitted for unsuccessfully received content.

In one aspect, AT 110 may communicate a priority indication using a priority indication module 114 facilitated through access module 112. Further, in one aspect, such communicated priority indication information may be received by AN 120 facilitated through resource allocation module 122. Additionally, resource allocation module 122 may further include AT priority indication module 124 and flow priority indication module 125. In one aspect, AN 120 may communicate with one or more network components 130 (e.g., packet data serving node (PDSN)) to further facilitate AT priority indication and queuing.

In one aspect, priority indication module 114 may be enabled to include a priority element into an access request. In one such aspect, priority indication module 114 may reserve special FlowProfileIDs or a special QCI for denoting a priority communication. For example, in CDMA networks a currently reserved type, such as FlowProfileID type '11' may be allocated to indication priority. In another example, bits from a quality of service (QoS) message may be assigned to indicate a priority communication. In yet another example, certain flow priority values, such as 1000-1111 may be used to indicate a priority communication. Still further, in one aspect, over the air signaling and/or A11 signaling may be used in indicating a communication to have priority.

In one aspect, the AN 120 and/or network 130 may enable a priority communication to be indicated to a receiving entity (e.g., another AT). In one such aspect, based on the priority status of the call originating entity, a resource priority header (RPH) in a session initiation protocol (SIP) invite may indicate priority to the network 130 (e.g., call center control function (CSCF)). Further, network 130 may detect a communication as a priority communication to a policy charging and resource function (PCRF) and a PCRF may inform a receiving end PDSN of the priority status of a communication. In one aspect, a receiving end network 130 entity may perform a network initiated QoS setup with the receiving AT using reserved a FlowProfileID or flow priority. In another aspect, a receiving end network 130 entity may use A11 signaling to notify a terminating AN that the communication is priority service.

In one aspect, AT priority module 124 may be enabled to detect a priority status of an AT 110 and may further assist resource allocation module 122 in allocation of resources to the priority AT. In one aspect, AT priority module 124 may page the AT 110 as soon as the resource becomes available. In another aspect, AT priority module 124 may queue a connection request from the AT 110, and send a direct-traffic-channel assignment as soon as the resource becomes available. In such an aspect, the AT may not have to perform an access procedure to obtain the traffic channel. In still another aspect, AT priority module 124 may queue a connection request from the AT 110, and send a connection deny message with an indication of resource-pending, and then later may send the traffic channel assignment when resources are ready.

In one aspect, flow priority module 125 may be enabled to detect a priority resource request from an AT 110 and may further assist resource allocation module 122 in allocation of priority resources to the priority AT with a priority resource request. In one aspect, the AT 110 may indicate to AN 120 a resource request for a data link flow is a priority resource request. In another aspect, AN 120 may receive a notification from a network 130 entity (e.g., network gateway, PDSN, etc.) indicating the AT 110 may be granted a priority resource data link flow. In such an aspect, the notification may be received using SIP signaling. In one operational example, network 130 may receive a priority resource request using a SIP message, and after network 130 has authorized the SIP request, network 130 may push the priority status from network 130 to AN 120. Further, in such an aspect, resource allocation module 122 may queue the AT 110 request in a priority queue.

Figure 2:
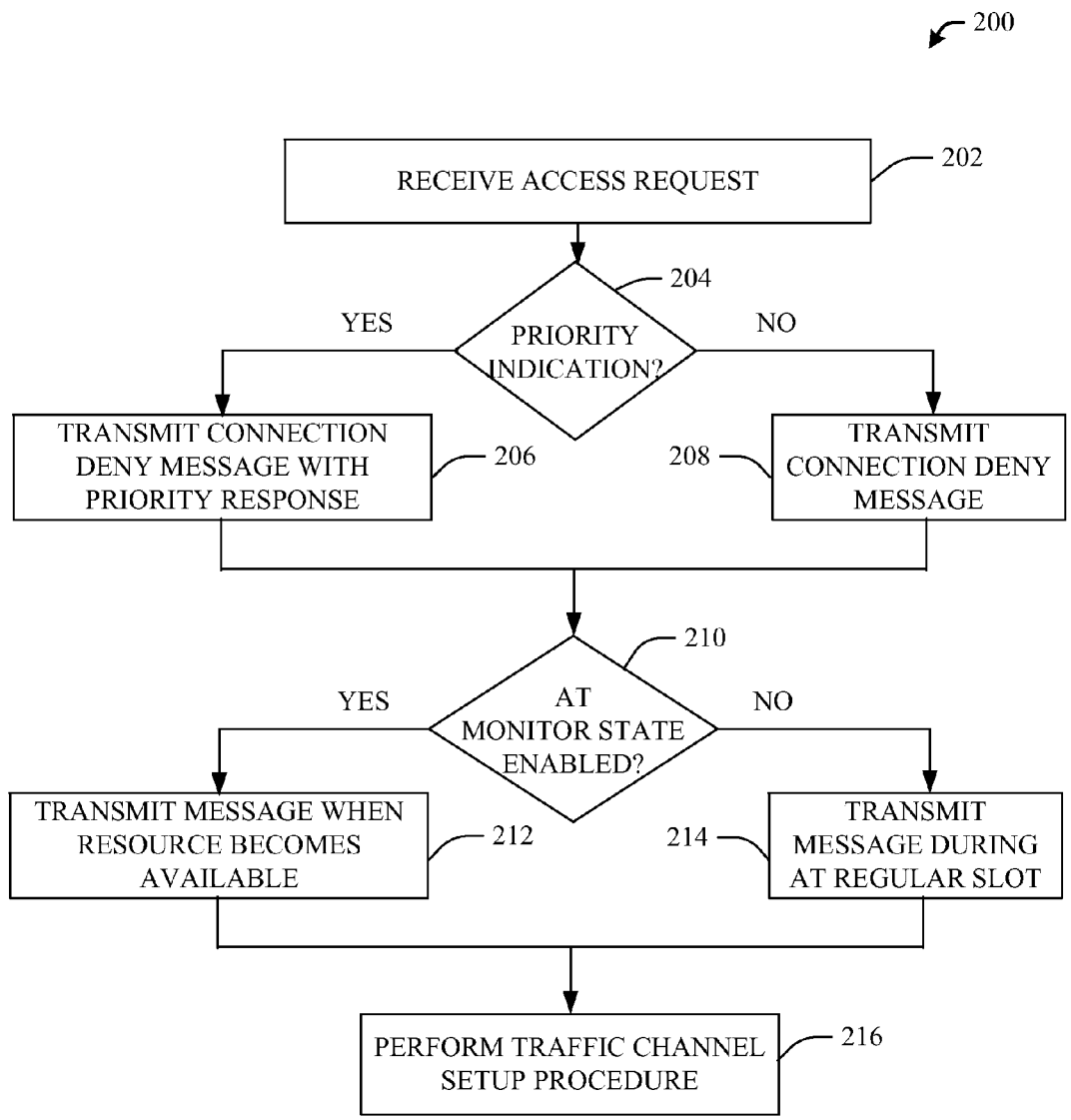
FIG. 2 depicts an exemplary flow diagram of a methodology for facilitating priority indication for an AT according to an aspect.
Figure 3:
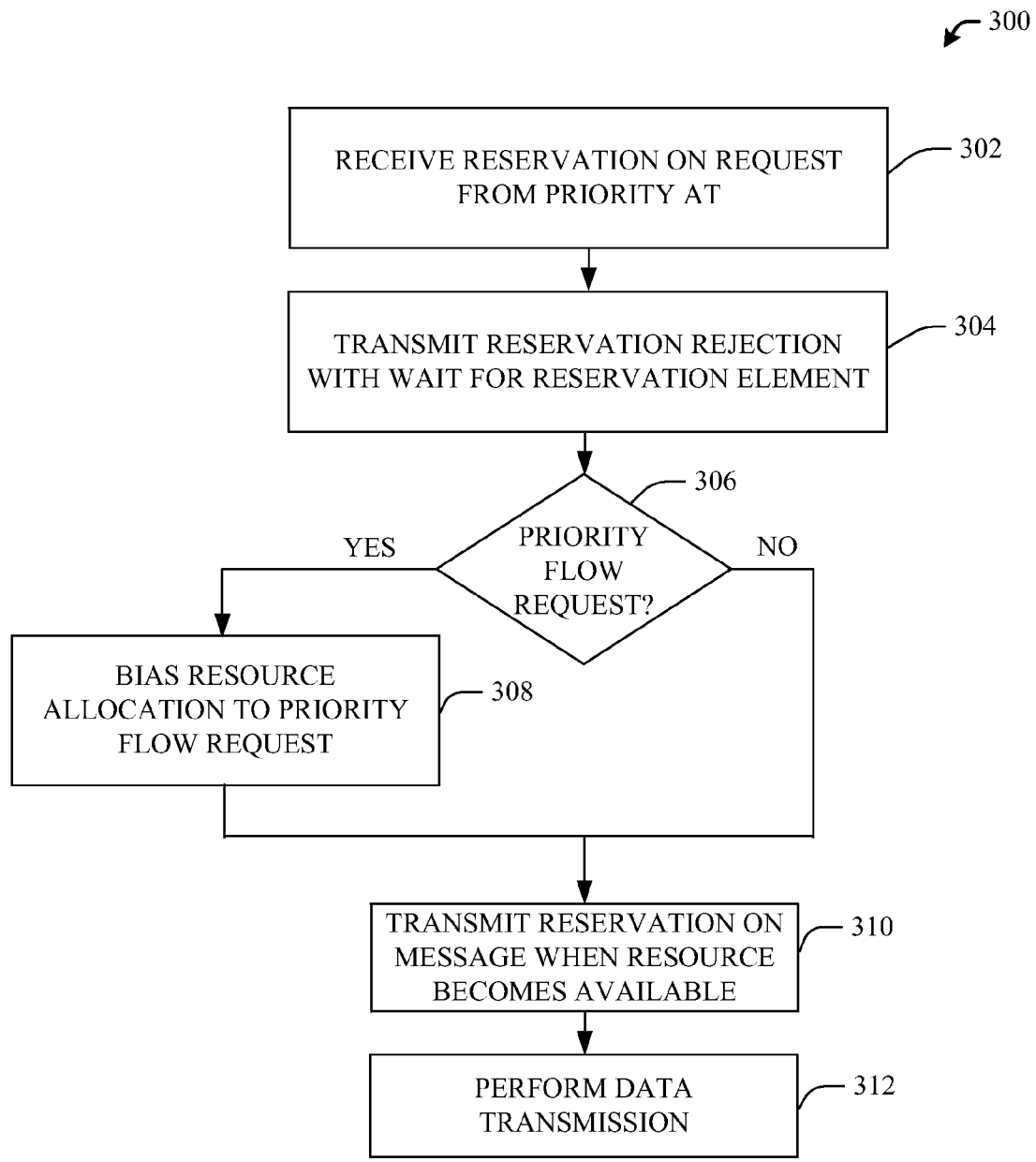
FIG. 3 depicts an exemplary flow diagram of a methodology for facilitating priority indication and queuing for an AT according to an aspect.

FIGS. 2 and 3 illustrate various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 2, exemplary method 200 for facilitating a priority indication for an access terminal (AT) is illustrated. At reference numeral 202, an access request may be received from an AT when an AN does not have sufficient resources to fulfill the AT request. In one aspect, the access request may include a connection request. At reference numeral 204 it is determined whether the access request includes a priority indication. In one aspect, the priority indication may be explicitly communicated from the AT to the AN. In another aspect, the priority indication may be determined by the AN based on indication from PDSN. If at reference numeral 204 it is determined that the access request does include a priority indication then at reference numeral 206 a connection deny message may be transmitted with a priority response. In one aspect, the priority response may prompt the requesting AT to enter a monitor state mode. In another aspect, the priority response may include a pending period to prompt the AT to enter a monitor state mode for a time defined by the pending period. If at reference numeral 204 it is determined that the access request may not be granted a priority indication then at reference numeral 208 a connection deny message may be transmitted to the AT.

At reference numeral 210 it is determined whether an AT is enabled to enter a monitor state mode. In one aspect, the AT may indicate in the access request that the AT is monitor state mode enabled. In another aspect, the AN may receive a notification from an network entity, such as a PDSN, to indicate the requesting AT is in the monitor state mode. In yet another aspect, an AN may determine an AT is not the monitor state enabled by unsuccessfully transmitting a resource available message to the AT.

If at reference numeral 210, it is determined that the AT is in the monitor state mode enabled then at reference numeral 212 a resource available message may be transmitted to the requesting AT as soon as sufficient resources are available. By contrast, if at reference numeral 210, it is determined that the AT is not in monitor state then at reference numeral 214 a resource available message may be transmitted at the next regular slotted time for the requesting AT. In one aspect, the AN may be notified of the regular slotted time for the AT by an network entity. In one aspect, transmissions to the AT may be performed using a paging message, a traffic channel assignment message, etc. Thereafter, at reference numeral 216, traffic channel setup procedures may be performed.

Turning now to FIG. 3, exemplary method 300 for facilitating priority indication and queuing for an access terminal (AT) is illustrated. At reference numeral 302, a reservation on request may be received from an AT. At reference numeral 304, a reservation rejection message may be transmitted with a wait for reservation element. In one aspect, the waiting for reservation state element to prompt the AT to enter a waiting for reservation state in which the AT does not transmit another reservation on request and is available to receive a reservation on message. At reference numeral 306 it is determined whether the AT needs to be granted a priority flow. In one aspect, a priority flow status may be indicated in a reservation on request by the AT. In another aspect, the AN may be notified by a network entity, such as a PDSN, that the requested flow in a priority flow.

If at reference numeral 306 it is determined that requested resources are for a priority flow then at reference numeral 308 the request may be further prioritized. In one aspect, a priority AT requesting a priority flow may be queued in a priority flow queue and the AN may bias resource allocation to ATs in the priority flow queue over ATs in a general queue for resources. At reference numeral 310 a reservation on message may be transmitted to the AT and at reference numeral 312 data transmission may be performed. As such, an AN may be informed of a priority flow request status after a reservation request was already rejected by the AN and may further allow the AN to add a priority flow request to a priority queue when the AN is informed that this flow is a priority-flow.

Figure 4A:
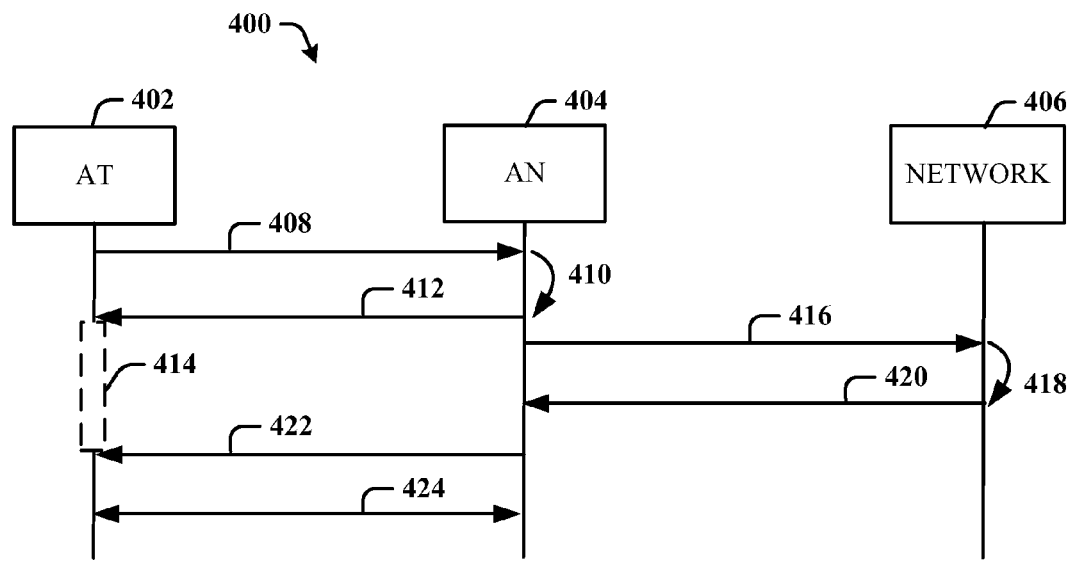
FIG. 4A is an exemplary call-flow diagram of a methodology for facilitating priority indication for an AT according to an aspect.
Figure 4B:
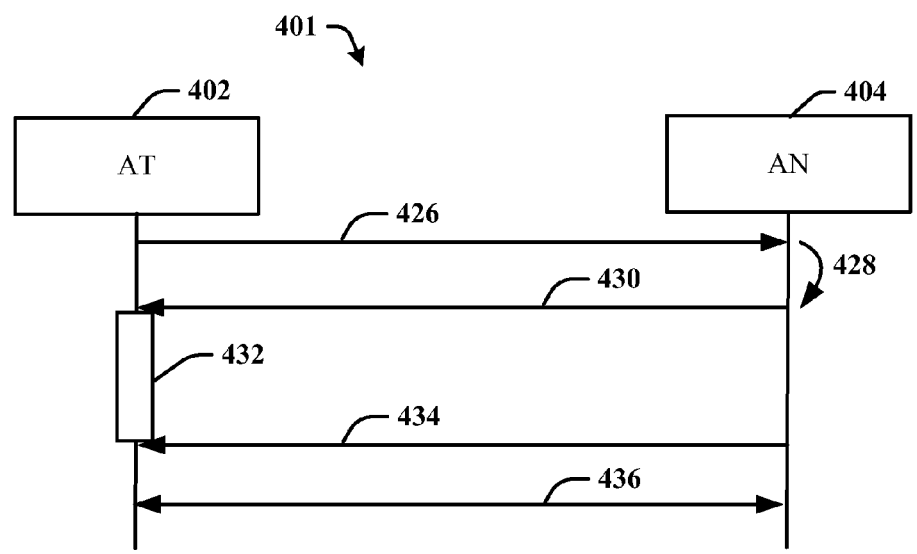
FIG. 4B is an exemplary call-flow diagram of a methodology for facilitating priority indication for an AT according to an aspect.
Figure 5:
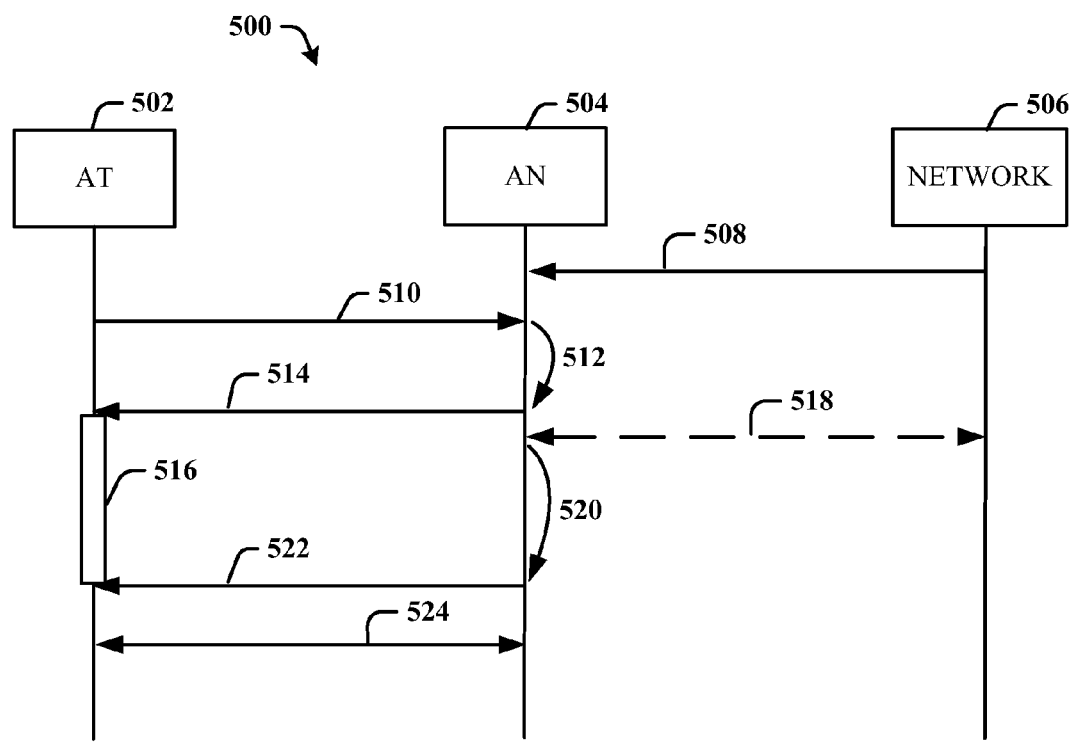
FIG. 5 is an exemplary call-flow diagram of a methodology for facilitating priority indication and queuing for an AT according to an aspect

With respect to FIGS. 4A, 4B and 5, call flows of exemplary systems 400, 401 and 500 for facilitating priority indications and queuing for an AT are illustrated. Generally, AT 402, 502 and access network (AN) 404, 504 may communicate, where communication may further be facilitated through a network entity 406, 506, such as but not limited to a PDSN. As used herein, AT 404, 504 may include one or more Node Bs, one or more RNCs, etc.

Turning now to FIG. 4A, at sequence step 408 an AT 402 may transmit an access request to an AN 404. In one aspect, the access request may include a connection request, a reservation on request, etc. At sequence step 410, it is determined that there are insufficient resources available to the AN 404 to fulfill the AT 402 request. At sequence step 412, AN 404 transmits an access deny message to AT 402. In one aspect, the access deny message may include a connection deny message, a reservation rejection message, etc. Optionally, at sequence step 414, an AT 402 may be enabled to enter a monitor-state which may allow the AT 402 to be receptive to receipt of an access message once sufficient resources are available at the AN 404. Additionally, or in the alternative an AT 402 may return to a regular slotted mode upon receipt of an access deny message.

At sequence 416, AN 404 may transmit a message to a network entity 406 to determine whether a requesting AT 402 is a priority AT. At sequence step 418, the AT is determined to be a priority AT and, at sequence step 420, the priority indication is transmitted back to the AN 404. AN 404 may add the priority AT to a queue to receive resources when they become available. At sequence step 422, a resource available message may be transmitted to the AT 402. In one aspect, the resource available message may include a paging message, a traffic channel assignment, a reservation on message, etc. In one aspect, in which the AT 402 is in a monitor state mode, the AT 402 may receive the message as soon as the resources have become available. In another aspect, AN 404 may wait until the next known awake time for AT 402 and may transmit the resource available message then. For example the AN 404 may page the AT 402 in the non-slotted mode to indicate resource readiness. At sequence step 424, At 402 and AN 404 may traffic channel set up to enable communications using the allocated resources.

Turning now to FIG. 4B, at sequence step 426 an AT 402 may transmit an access request to an AN 404. In one aspect, the access request may include a priority indication from the AT 404. In one aspect, the priority indication may prompt the AN 404 that the AT 402 is requesting a queuing of a resource request at the AN 404. At sequence step 428, it is determined that there are insufficient resources available to the AN 404 to fulfill the AT 402 request. At sequence step 430, AN 404 may transmit an access deny message to the AT 402, where the access deny message may include a pending period element. In such an aspect, at sequence step 432, the AT 402 may enter a monitor state to wait for a resource allocation for the duration denoted in the pending period element. In one aspect, if the AT 402 performs an inter-AN handover while in a pending period, the resource request queue may follow the AT 402. By contrast, if an AT 402 performs a handover to a new AN, pending period may be terminated and the AT may transmit a new access request to the new AN.

At sequence step 434, a resource available message may be transmitted to the AT 402. In one aspect, the resource available message may include a paging message, a traffic channel assignment, a reservation on message, etc. In one aspect, in which the AT 402 is in a monitor state mode, the AT 402 may receive the message as soon as the resources have become available. At sequence step 436, AT 402 and AN 404 may traffic channel set up to enable communications using the allocated resources.

Turning now to FIG. 5, at sequence step 508 an indication of which ATs 502 are priority AT in provided to an AN 504. At sequence step 510 a reservation on request may be transmitted from AT 502. In one aspect, the AT has requested a priority flow. In one aspect, the AT is indicated as a priority AT 502. At sequence step 512, it is determined that there are insufficient resources available to the AN 504 to fulfill the AT 502 request. At sequence step 514, AN 504 may transmit reservation rejection message to the AT 502, where the access deny message may include a waiting for reservation state element to prompt the AT 502 to enter a waiting for reservation state in which the AT 502 does not transmit another reservation on request and is available to receive a reservation on message. In one aspect, if the AT 502 performs an inter-AN handover while in a waiting for reservation state, the resource request queue may follow the AT 502. By contrast, if an AT performs an handover to a new AN, the waiting for a reservation mode may be terminated and the AT may transmit a new reservation on request to the new AN.

Additionally and/or optionally, at sequence step 518 the AN 504 may be notified that the requested resources are for a priority flow. At sequence step 520, the priority AT 502 requesting a priority flow may be queued in a priority flow queue. In one aspect, the AN 504 may bias resource allocation to ATs in the priority flow queue over ATs in a general queue for resources. At sequence step 522, a resource available message may be transmitted to the AT 502. In one aspect, the resource available message may include a reservation on message. In one aspect, in which the AT 502 is in a waiting for reservation mode, the AT 502 may receive the message as soon as the resources have become available. At sequence step 524, At 502 and AN 504 may start data communications. As such, the AN 504 may be informed of a priority flow request status after a reservation request was already rejected by the AN 504 and may further allow the AN 504 to add a priority flow request to a priority queue when the AN is informed that this flow is a priority-flow.

Figure 6:
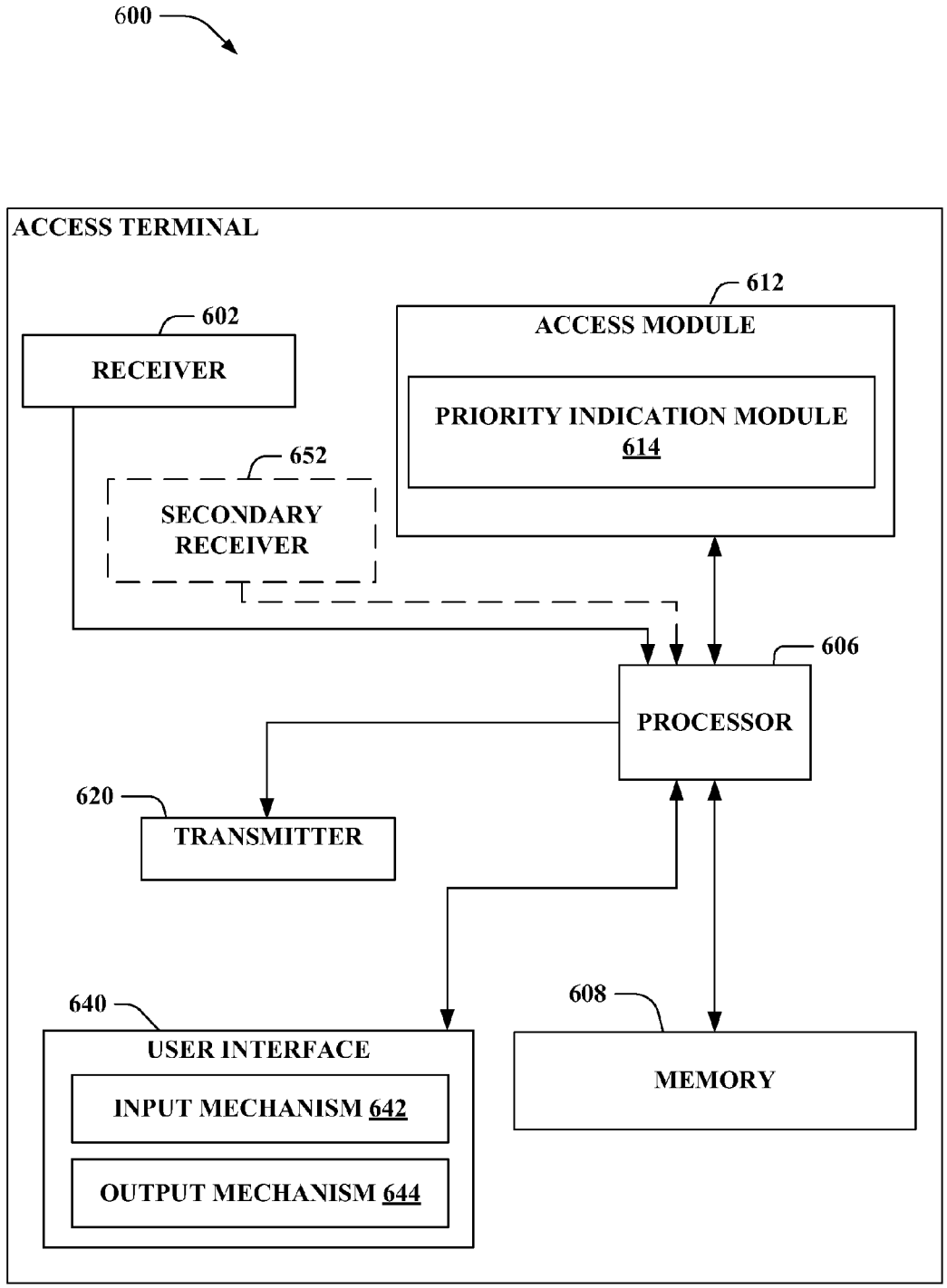
FIG. 6 depicts a block diagram of an exemplary access terminal that can for facilitate priority indication and queuing according to an aspect.

With reference now to FIG. 6, an illustration of an access terminal (AT) 600 (e.g., wireless communications device (WCD), a client device, etc.) that can facilitate priority indication and queuing is presented. AT 600 comprises receiver 602 that receives one or more signal from, for instance, one or more receive antennas (not shown), performs typical actions on (e.g., filters, amplifies, downconverts, etc.) the received signal, and digitizes the conditioned signal to obtain samples. Receiver 602 can further comprise an oscillator that can provide a carrier frequency for demodulation of the received signal and a demodulator that can demodulate received symbols and provide them to processor 606 for channel estimation. In one aspect, AT 600 may further comprise secondary receiver 652 and may receive additional channels of information.

Processor 606 can be a processor dedicated to analyzing information received by receiver 602 and/or generating information for transmission by one or more transmitters 620 (for ease of illustration, only one transmitter is shown), a processor that controls one or more components of AT 600, and/or a processor that both analyzes information received by receiver 602 and/or second receiver 652, generates information for transmission by transmitter 620 for transmission on one or more transmitting antennas (not shown), and controls one or more components of AT 600.

AT 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods is intended to comprise, without being limited to, these and any other suitable types of memory.

AT 600 can further comprise access module 612 that facilitates priority indications and queuing for communications from the AT 600. Access module 612 may further include priority indication module 614. In one aspect, AT 600 may communicate a priority indication using a priority indication module 614 facilitated through access module 612.

In one aspect, priority indication module 614 may be enabled to include a priority element into an access request. In one such aspect, priority indication module 614 may reserve special FlowProfileIDs for denoting a priority communication. For example, a currently reserved type, such as FlowProfileID type '11' may be allocated to indication priority. In another example, bits from a quality of service (QoS) message may be assigned to indicate a priority communication. In yet another example, certain flow priority values, such as 1000-1111 may be used to indicate a priority communication.

Additionally, AT 600 may include user interface 640. User interface 640 may include input mechanisms 642 for generating inputs into AT 600, and output mechanism 642 for generating information for consumption by the user of AT 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, a Personal Area Network (PAN) transceiver etc. In the illustrated aspects, output mechanism 644 may include a display operable to present content that is in image or video format or an audio speaker to present content that is in an audio format.

Figure 7:
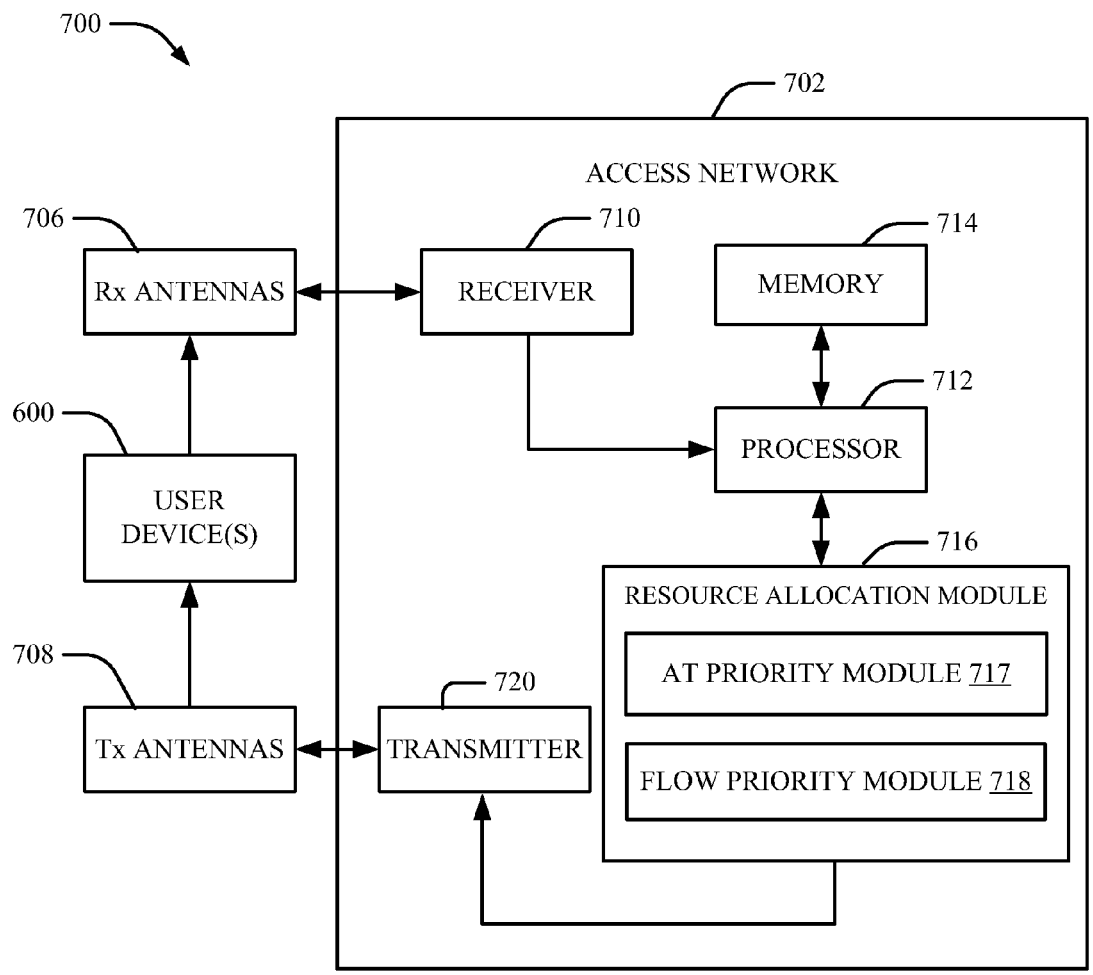
FIG. 7 is a block diagram depicting the architecture of an access network configured to facilitate priority indication and queuing for an AT, according to another aspect herein described.

With reference to FIG. 7, an example system 700 that comprises a access network 702 with a receiver 710 that receives signal(s) from one or more user devices 600 through a plurality of receive antennas 706, and a transmitter 720 that transmits to the one or more user devices 600 through a plurality of transmit antennas 708. Receiver 710 can receive information from receive antennas 706. Symbols may be analyzed by a processor 712 that is similar to the processor described above, and which is coupled to a memory 714 that stores information related to data processing. Processor 712 is further coupled to a resource allocation module 716 that facilitates allocation of resources to one or more user devices 600. Signals may be multiplexed and/or prepared for transmission by a transmitter 720 through one or more transmit antennas 708 to user devices 600.

In one aspect, resource allocation module 716 may include AT priority module 717, and flow priority module 718. In one aspect, AT priority module 717 may be enabled to detect a priority status of an AT 600 and may further assist resource allocation module 716 in allocation of resources to the priority AT. In one aspect, AT priority module 717 may prompt AN 702 to page the AT 600 as soon as the resource becomes available. In another aspect, AT priority module 717 may prompt AN 702 to queue a connection request from the AT 600, and send a direct-traffic-channel assignment as soon as the resource becomes available. In still another aspect, AT priority module 717 may prompt AN 702 to queue a connection request from the AT 600, and send the traffic channel assignment when resources are ready, with an early indication of a resource-pending notification.

In one aspect, flow priority module 718 may be enabled to detect a priority resource request from an AT 600 and may further assist resource allocation module 716 in allocation of priority resources to the priority AT with a priority resource request. In one aspect, the AT 600 may indicate to AN 702 a resource request is a priority resource request. In another aspect, AN 702 may receive a notification from a network entity (e.g., PDSN) indicating the AT 600 resource request is a priority resource request. In such an aspect, the notification may be received using SIP signaling. Further, in such an aspect, resource allocation module 716 may queue the AT 600 request in a priority queue.

Figure 8:
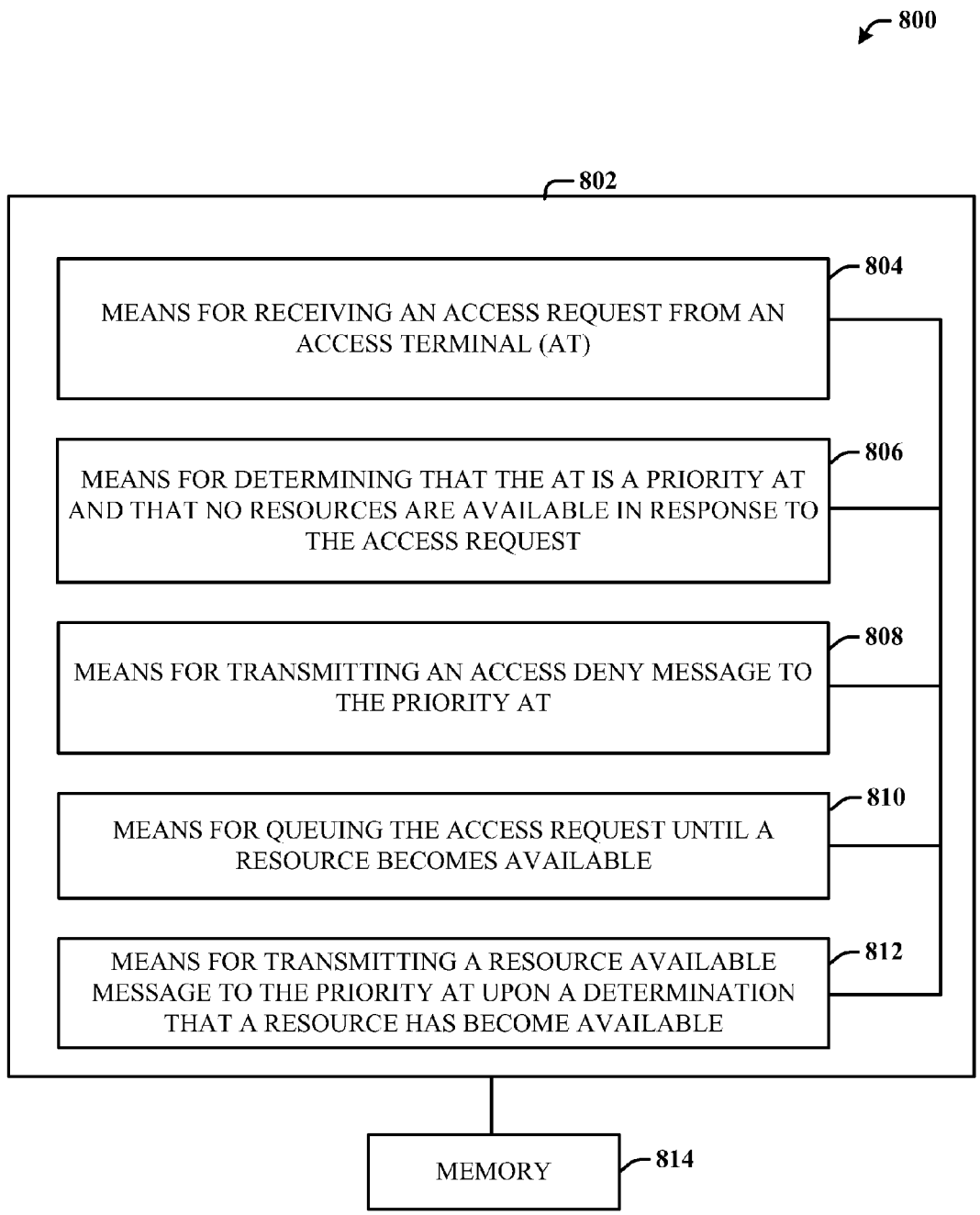
FIG. 8 depicts a block diagram of an exemplary communication system that can for facilitate priority indication and queuing according to an aspect.

With reference to FIG. 8, a block diagram of an exemplary system 800 that can facilitate priority indication and queuing for communications is illustrated. For example, system 800 can reside at least partially within an access network, base station, E-Node B, etc. It is to be appreciated that system 800 is represented as including functional blocks, which can be functional blocks that represent functions implemented by a processor, software, or combination thereof (e.g., firmware). System 800 includes a logical grouping 802 of means that can act in conjunction. For instance, logical grouping 802 can include means for receiving an access request from an access terminal (AT) 804. In one aspect, the access request may include an AT priority indication, wherein the AT priority indication may allow the AN to determine the AT is a priority AT. In another aspect, the access request may include a resource on request.

Further, logical grouping 802 can comprise means for determining that the AT is a priority AT and that no resources are available in response to the access request 806. In one aspect, the AT is determined to be a priority AT from receiving an AT priority indication from a PDSN. Still further, logical grouping 802 can comprise means for transmitting an access deny message to the priority AT 808. In one aspect, the access deny message may include a connection deny message, a resource rejection message, etc. In another aspect, the resource rejection message may include an element to prompt the priority AT to wait for a resource allocation. Yet further, logical grouping 802 can comprise means for queuing the access request until a resource becomes available 810. In one aspect, queuing may further comprise biasing a priority of resource allocation toward a priority AT with a resource priority indication. Yet further, logical grouping 802 can comprise means for transmitting a resource available message to the priority AT upon a determination that a resource has become available 812. In one aspect, the resource available message may include a paging message, a traffic channel assignment, a resource on message, etc.

Additionally, system 800 can include a memory 814 that retains instructions for executing functions associated with the means 804, 806, 808, 810 and 812. While shown as being external to memory 814, it is to be understood that one or more of the means 804, 806, 808, 810 and 812 can exist within memory 814.

Figure 9:
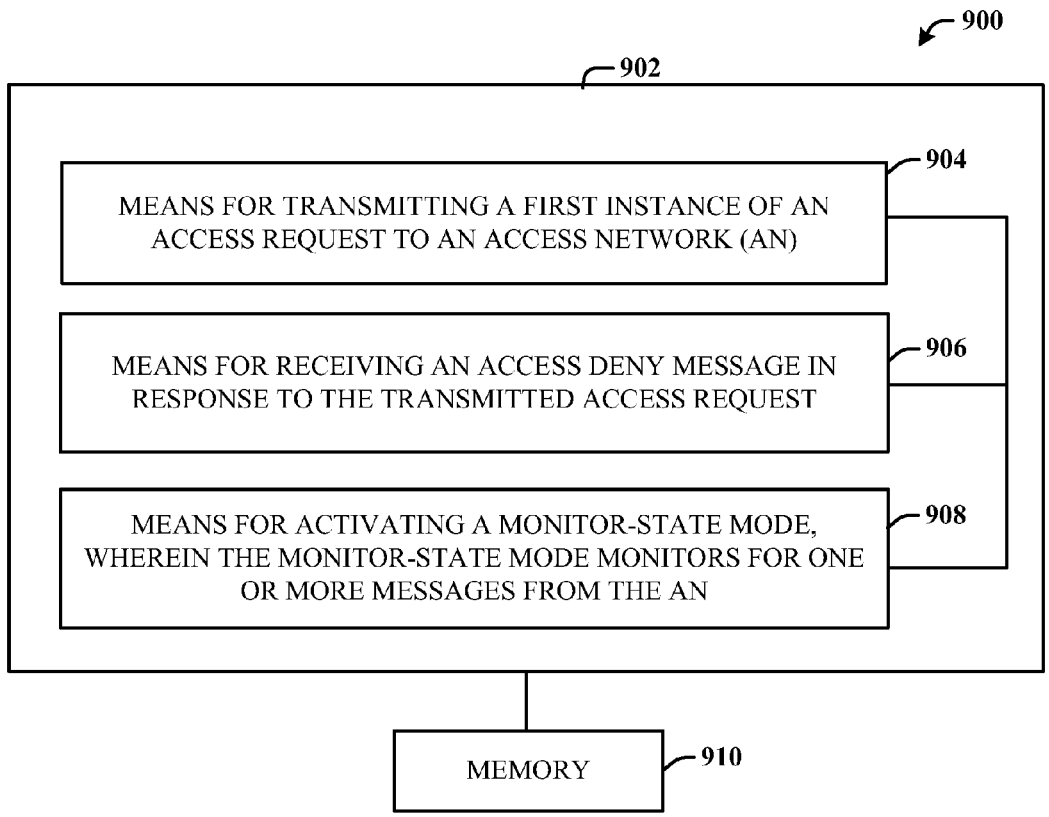
FIG. 9 depicts another block diagram of an exemplary communication that can for facilitate priority indication according to an aspect.

With reference to FIG. 9, a block diagram of an exemplary system 900 that can facilitate priority indication and queuing for communications is illustrated. For example, system 900 can reside at least partially within an access terminal, wireless communications device, etc. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include means for transmitting a first instance of an access request to an access network (AN) 904. In one aspect, the access request may include an AT priority indication.

Further, logical grouping 902 can comprise means for receiving an access deny message in response to the transmitted access request 906. In one aspect, the access deny message may include a pending period element. Still further, logical grouping 902 can comprise means for activating a monitor-state mode, wherein the monitor-state mode monitors for one or more messages from the AN 908. In one aspect, the monitor-state mode may be activated in response to receiving a pending period element in the access deny message.

Additionally, system 900 can include a memory 910 that retains instructions for executing functions associated with the means 904, 906 and 908. While shown as being external to memory 910, it is to be understood that one or more of the means 904, 906 and 908 can exist within memory 910.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of priority indication in wireless communications, the method comprising:
   receiving an access request from an access terminal (AT);
   determining that the AT is a priority AT and that no resources are available;
   transmitting, by an access network (AN), an access deny message to the priority AT in response to the access request, wherein the access deny message includes a pending period to prompt the priority AT to enter a monitor state mode for a time defined by the pending period, and wherein the monitor state mode prohibits the priority AT from sending another access request during the pending period and causes the priority AT to be receptive to messages from the AN throughout the pending period;
   queuing the access request until a resource becomes available;
   determining whether the priority AT is enabled to wait in the monitor state mode;
   transmitting a first resource available message to the priority AT upon a determination that a resource has become available and the AT is enabled to wait in the monitor state mode, wherein the first resource available message is transmitted as soon as the resource has become available; and
   transmitting a second resource available message at a next regular slot for the priority AT when the AT is not enabled to wait in the monitor state mode, wherein the next regular slot is a time when the priority AT is available to receive the second resource available message outside of the monitor state mode.

2. The method of claim 1, wherein the access request includes an AT priority indication, and wherein the AT is determined to be the priority AT from the AT priority indication.

3. The method of claim 1, further comprising:
   receiving an AT priority indication from a network gateway, and wherein the AT is determined to be at least one of the priority AT or that a flow is a priority flow.

4. The method of claim 1, wherein the access request includes a resource on request, further comprising:
   receiving a resource priority indication from a network gateway; and
   wherein the queuing further comprises biasing resource allocation toward the priority AT with the resource priority indication.

5. The method of claim 1, wherein the first resource available message and the second resource available message include at least one of: a paging message, a traffic channel assignment, or a resource on message.

6. The method of claim 1, wherein the determining the AT is the priority AT comprises at least one of identifying that the AT has a priority status, or identifying that a flow associated with the AT has a priority status.

7. The method of claim 1, wherein the access deny message includes at least one of: a connection deny message or a resource rejection message.

8. The method of claim 7, wherein the resource rejection message includes an element to prompt the priority AT to wait for a resource allocation.

9. A non-transitory computer-readable medium storing computer executable code, comprising:
   code for causing a computer to receive an access request from an access terminal (AT);
   code for causing the computer to determine that the AT is a priority AT and that no resources are available;
   code for causing the computer to transmit, by an access network (AN), an access deny message to the priority AT in response to the access request, wherein the access deny message includes a pending period to prompt the priority AT to enter a monitor state mode for a time defined by the pending period, and wherein the monitor state mode prohibits the priority AT from sending another access request during the pending period and causes the priority AT to be receptive to messages from the AN throughout the pending period;
   code for causing the computer to queue the access request until a resource becomes available;
   code for determining whether the priority AT is enabled to wait in the monitor state mode;
   code for causing the computer to transmit a first resource available message to the priority AT upon a determination that a resource has become available and the priority AT is enabled to wait in the monitor state mode, wherein the first resource available message is transmitted as soon as the resource has become available; and
   code for causing the computer to transmit a second resource available message at a next regular slot for the priority AT when the AT is not enabled to wait in the monitor state mode, wherein the next regular slot is a time when the priority AT is available to receive the second resource available message outside of the monitor state mode.

10. An apparatus, comprising:
    means for receiving an access request from an access terminal (AT);
    means for determining that the AT is a priority AT and that no resources are available;
    means for transmitting, by an access network (AN), an access deny message to the priority AT in response to the access request, wherein the access deny message includes a pending period to prompt the priority AT to enter a monitor state mode for a time defined by the pending period, and wherein the monitor state mode prohibits the priority AT from sending another access request during the pending period and causes the priority AT to be receptive to messages from the AN throughout the pending period;
    means for queuing the access request until a resource becomes available;
    means for determining whether the priority AT is enabled to wait in the monitor state mode;
    means for transmitting a first resource available message to the priority AT upon a determination that a resource has become available and the priority AT is enabled to wait in the monitor state mode, wherein the first resource available message is transmitted as soon as the resource has become available; and
    means for transmitting a second resource available message at a next regular slot for the priority AT when the priority AT is enabled to wait in the monitor state mode, wherein the next regular slot is a time when the priority AT is available to receive the second resource available message outside of the monitor state mode.

11. An access network (AN), comprising:
a transceiver operable to:
  receive an access request from an access terminal (AT);
a resource allocation module operable to:
  determine that the AT is a priority AT and that no resources are available in response to the access request; and
  queue the access request until a resource becomes available;
wherein the transceiver is further operable to:
  transmit an access deny message to the priority AT in response to the access request, wherein the access deny message includes a pending period to prompt the priority AT to enter a monitor state mode for a time defined by the pending period, and wherein the monitor state mode prohibits the priority AT from sending another access request during the pending period and causes the priority AT to be receptive to messages from the AN throughout the pending period;
  determine whether the priority AT is enabled to wait in the monitor state mode;
  transmit a first resource available message to the priority AT upon a determination that a resource has become available and the priority AT is enabled to wait in the monitor state mode, wherein the first resource available message is transmitted as soon as the resource has become available; and
  transmit a second resource available message at a next regular slot for the priority AT when the priority AT is not enabled to wait in the monitor state mode, wherein the next regular slot is a time when the priority AT is available to receive the second resource available message outside of the monitor state mode.

12. The AN of claim 11, wherein the access request includes an AT priority indication, and wherein the resource allocation module is further operable to determine that AT is the priority AT from the AT priority indication.

13. The AN of claim 11, wherein the transceiver is further operable to receive an AT priority indication from a network gateway, and wherein the AT is determined to be at least one of the priority AT or that a flow is a priority flow.

14. The AN of claim 11, wherein the access request includes a resource on request, wherein the transceiver is further operable to receive a resource priority indication from a network gateway, and wherein the resource allocation module is further operable to bias resource allocation toward the priority AT with the resource priority indication.

15. The AN of claim 11, wherein the first resource available message and the second resource available message include at least one of: a paging message, a traffic channel assignment, or a resource on message.

16. The AN of claim 11, wherein the resource allocation module is further operable for at least one of identifying that the AT has a priority status, or identifying that a flow associated with the AT has a priority status.

17. The AN of claim 11, wherein the access deny message includes at least one of: a connection deny message or a resource rejection message.

18. The AN of claim 17, wherein the resource rejection message includes an element to prompt the priority AT to wait for a resource allocation.

19. A method of priority indication by an access terminal (AT), comprising:
transmitting a first instance of an access request to an access network (AN);
receiving, from the AN, an access deny message in response to the transmitted access request, wherein the access deny message includes a pending period element;
activating a monitor state mode, wherein the monitor state mode is activated for a pending period in response to the received pending period element, wherein the monitor state mode prohibits the AT from sending another access request during the pending period, and wherein the monitor state mode monitors for one or more messages from the AN throughout the pending period;
determining whether the AT is enabled to wait in the monitor state mode;
receiving a first resource available message indicating that a resource has become available, wherein the first resource available message is transmitted as soon as the resource has become available when the priority AT is enabled to wait in the monitor state mode; and
receiving a second resource available message at a next regular slot for the AT, wherein the next regular slot is a time when the AT is available to receive the second resource available message outside of the monitor state mode when the priority AT is not enabled to wait in the monitor state mode.

20. The method of claim 19, wherein the first instance of the access request includes an AT priority indication.

21. The method of claim 19, further comprising:
determining that the pending period associated with the pending period element has expired; and
transmitting a second instance of the access request.

22. A non-transitory computer-readable medium storing computer executable code, comprising:
code for causing a computer to transmit an access request to an access network (AN);
code for causing the computer to receive, from the AN, an access deny message in response to the transmitted access request, wherein the access deny message includes a pending period element;
code for causing the computer to activate a monitor state mode, wherein the monitor state mode is activated for a pending period in response to the received pending period element, wherein the monitor state mode prohibits the AT from sending another access request during the pending period, and wherein the monitor state mode monitors for one or more messages from the AN throughout the pending period;
code for causing the computer to determine whether the AT is enabled to wait in the monitor state mode;
code for causing the computer to receive a first resource available message indicating that a resource has become available when the AT is enabled to wait in the monitor state mode, wherein the first resource available message is transmitted as soon as the resource has become available; and
code for causing the computer to receive a second resource available message at a next regular slot for the AT when the AT is not enabled to wait in the monitor state mode, wherein the next regular slot is a time when the AT is available to receive the second resource available message outside of the monitor state mode.

23. An apparatus, comprising:
means for transmitting an access request to an access network (AN);

means for receiving, from the AN, an access deny message in response to the transmitted access request, wherein the access deny message includes a pending period element;

means for activating a monitor state mode, wherein the monitor state mode is activated for a pending period in response to the received pending period element, wherein the monitor state mode prohibits the AT from sending another access request during the pending period, and wherein the monitor state mode monitors for one or more messages from the AN throughout the pending period;

means for determining whether the AT is enabled to wait in the monitor state mode; and means for receiving a first resource available message indicating that a resource has become available, wherein the first resource available message is transmitted as soon as the resource has become available when the AT is enabled to wait in the monitor state mode and for receiving a second resource available message at a next regular slot for the AT when the AT is not enabled to wait in the monitor state mode, wherein the next regular slot is a time when the AT is available to receive the second resource available message outside of the monitor state mode.

24. An access terminal (AT), comprising:

a transceiver operable to:
  transmit an access request to an access network (AN); and
  receive, from the AN, an access deny message in response to the transmitted access request, wherein the access deny message includes a pending period element; and an access module operable to:
  activate a monitor state mode, wherein the monitor state mode is activated for a pending period in response to the received pending period element, wherein the monitor state mode prohibits the AT from sending another access request during the pending period, and wherein the monitor state mode monitors for one or more messages from the AN throughout the pending period;
  determine whether the AT is enabled to wait in the monitor state mode;
  receive a first resource available message indicating that a resource has become available, wherein the first resource available message is transmitted as soon as the resource has become available when the AT is enabled to wait in the monitor state mode; and
  receive a second resource available message at a next regular slot for the AT when the AT is not enabled to wait in the monitor state mode, wherein the next regular slot is a time when the AT is available to receive the second resource available message outside of the monitor state mode.

25. The AT of claim 24, wherein the access request includes an AT priority indication.

26. The AT of claim 24, wherein the access module is further operable to:
  determine that the pending period associated with the pending period element has expired; and
  transmit a second instance of the access request.

* * * * *